United States Patent

[11] 3,542,287

[72] Inventors Richard A. Schena
189 Lowell Ave.;
David Margaretos, 15 Rosedale Ave.,
Haverhill, Massachusetts 01830
[21] Appl. No. 749,834
[22] Filed Aug. 2, 1968
[45] Patented Nov. 24, 1970

[54] INVALID BALLOT DETECTOR
16 Claims, 7 Drawing Figs.
[52] U.S. Cl. ..................................... 235/61.7,
35/48; 235/61.9
[51] Int. Cl. ..................................... G06k 5/00,
G09b 7/06
[50] Field of Search ............................. 235/61.603,
61.6, 61.7, 61.9; 35/48

[56] References Cited
UNITED STATES PATENTS
| | | | |
|---|---|---|---|
| 3,050,248 | 8/1962 | Lindquist | 235/61.7 |
| 3,218,439 | 11/1965 | Holzer et al. | 235/61.7 |
| 3,267,258 | 8/1966 | Bene | 235/61.7 |
| 3,408,482 | 10/1968 | Busby | 235/61.7 |

Primary Examiner—Daryl W. Cook
Attorney—Berman, Davidson & Berman

ABSTRACT: A device for counting ballots, or test scores, and for detecting excessively marked ballots or test cards. The device consists of a housing having an endless belt conveyor and a magazine to feed ballots or test cards to the conveyor. Two spaced transverse rows of pairs of feeler electrodes are mounted on the housing over the belt conveyor, adapted to engage the choice-marking positions of the successive cards. Also, the housing is provided with a plurality of photosensors located over the side marginal portions of the belt conveyor in positions to respond to markings on the cards. The first row of feeler electrodes actuates a group of step relays to select the proper category of choice and also to detect an excessive number of marks on the ballot or test card. An invalid stamping solenoid responds to the detection to mark the detected card invalid. The second row of feeler electrodes detects the choice markings and transmits the markings to associated counters, and if a ballot or card is marked invalid, a photosensor detects this, prevents counting or sensing thereof, and actuates a solenoid which swings a ramp upwardly in the path of movement of the invalid card, causing it to be segregated.

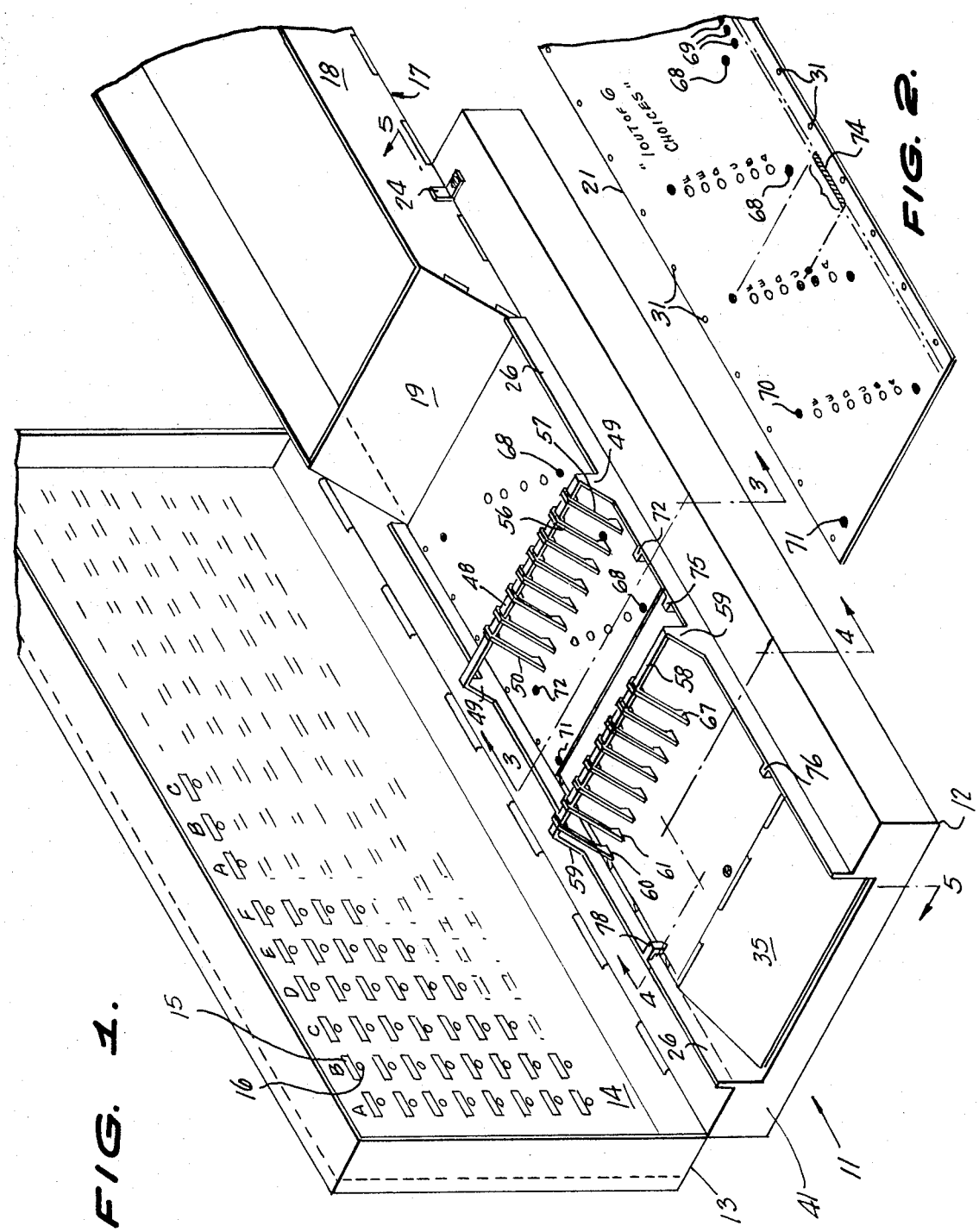

INVENTORS.
RICHARD A. SCHENA,
DAVID MARGARETOS,
BY
Berman, Davidson & Berman
ATTORNEYS.

Patented Nov. 24, 1970
3,542,287
Sheet 3 of 5
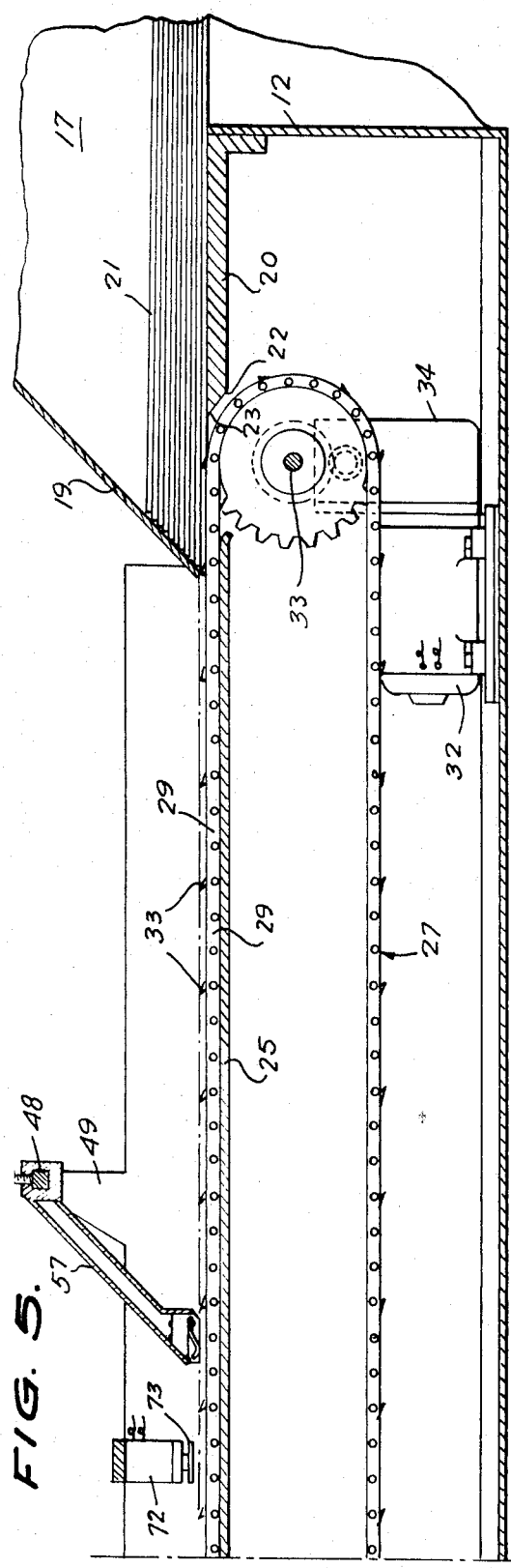
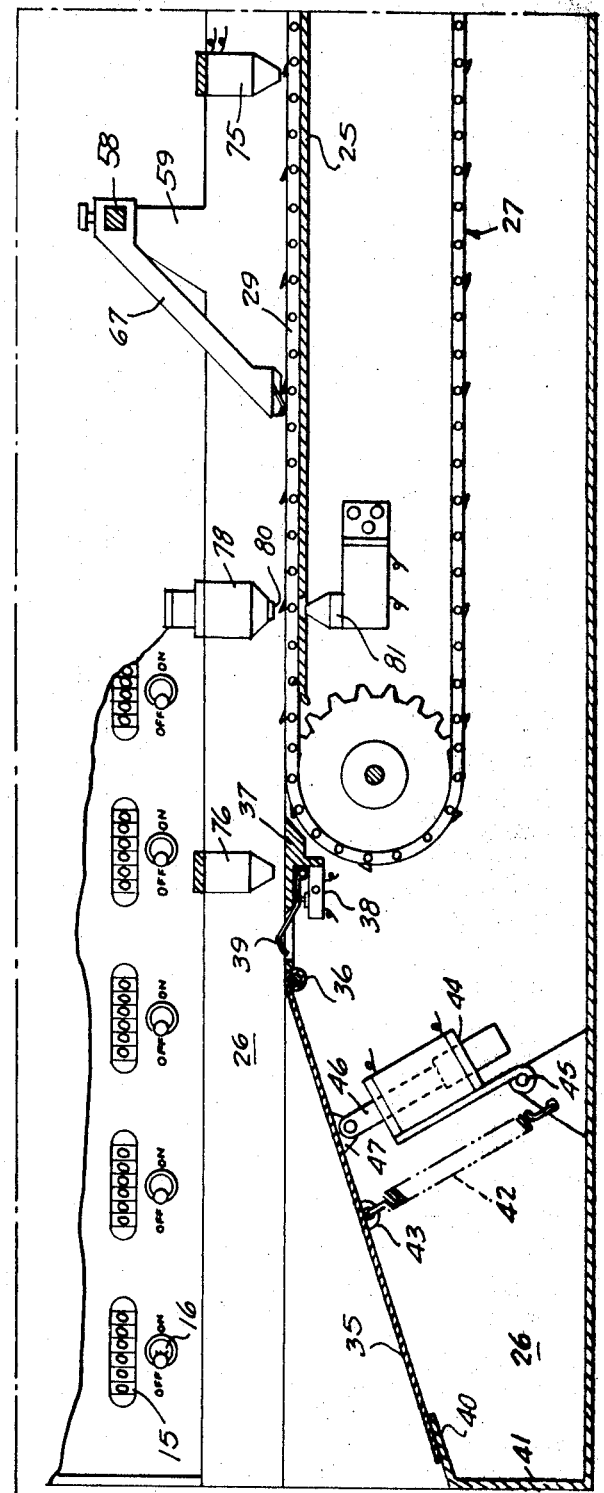
FIG. 5.
INVENTORS.
RICHARD A. SCHENA,
DAVID MARGARETOS,
BY
Berman, Davidson & Damon.
ATTORNEYS.

INVALID BALLOT DETECTOR

This invention relates to registers, and more particularly to a machine for counting ballots or test scores.

A main object of the invention is to provide a novel and improved machine for counting ballots or test scores and for rejecting improperly marked ballots or test cards, the machine being relatively simple in construction, being easy to set up for use, and being reliable in operation.

A further object of the invention is to provide an improved ballot or test score counting machine which is relatively compact in size, which is inexpensive to manufacture, and which rapidly and accurately totalizes ballots and test scores.

A still further object of the invention is to provide an improved ballot or test score counting machine which includes means for automatically detecting and rejecting improperly marked ballots or test cards in a manner which does not interfere with the counting of properly marked ballots or test cards, and which operates to segregate the improperly marked ballots or test cards from those which are properly marked.

A still further object of the invention is to provide an improved electrically-operated ballot or test card counting machine which includes means to detect different categories of answers or choices on test cards or ballots and to automatically condition itself to count the answers or choices in a selected category and to totalize said answers or choices, the machine being arranged to eliminate excessively marked ballots or test cards, and operating to provide rapid and accurate totals.

Further objects and advantages of the invention will become apparent from the following description and claims, and from the accompanying drawings, wherein:

FIG. 1 is a fragmentary perspective view of an improved ballot or test score counting machine constructed in accordance with the present invention.

FIG. 2 is a fragmentary perspective view of a typical ballot or card employed in the machine of FIG. 1.

FIG. 5 is an enlarged fragmentary longitudinal vertical cross-sectional view taken substantially on line 5—5 of FIG. 1.

Figure 6:
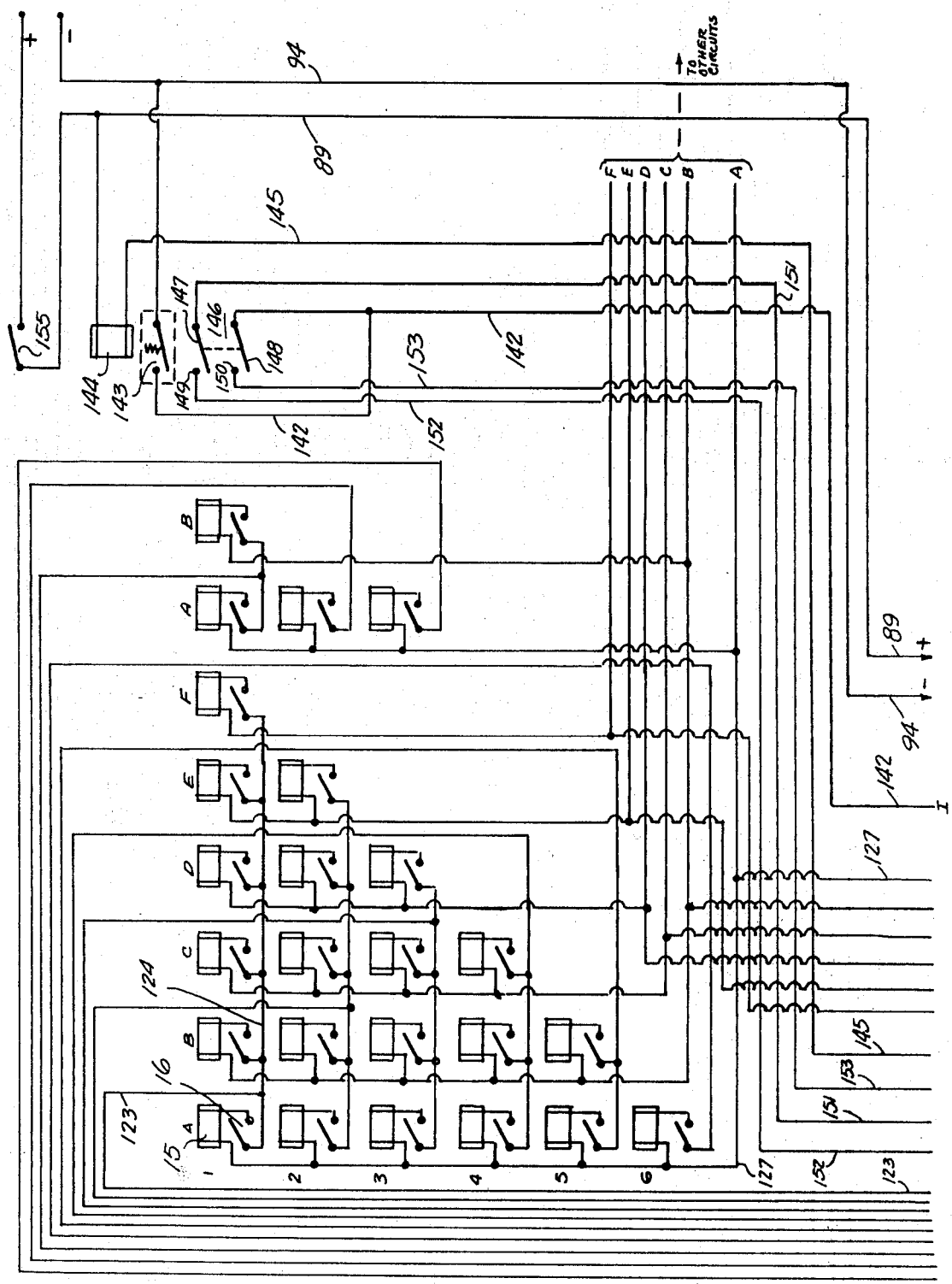
Figure 6A:
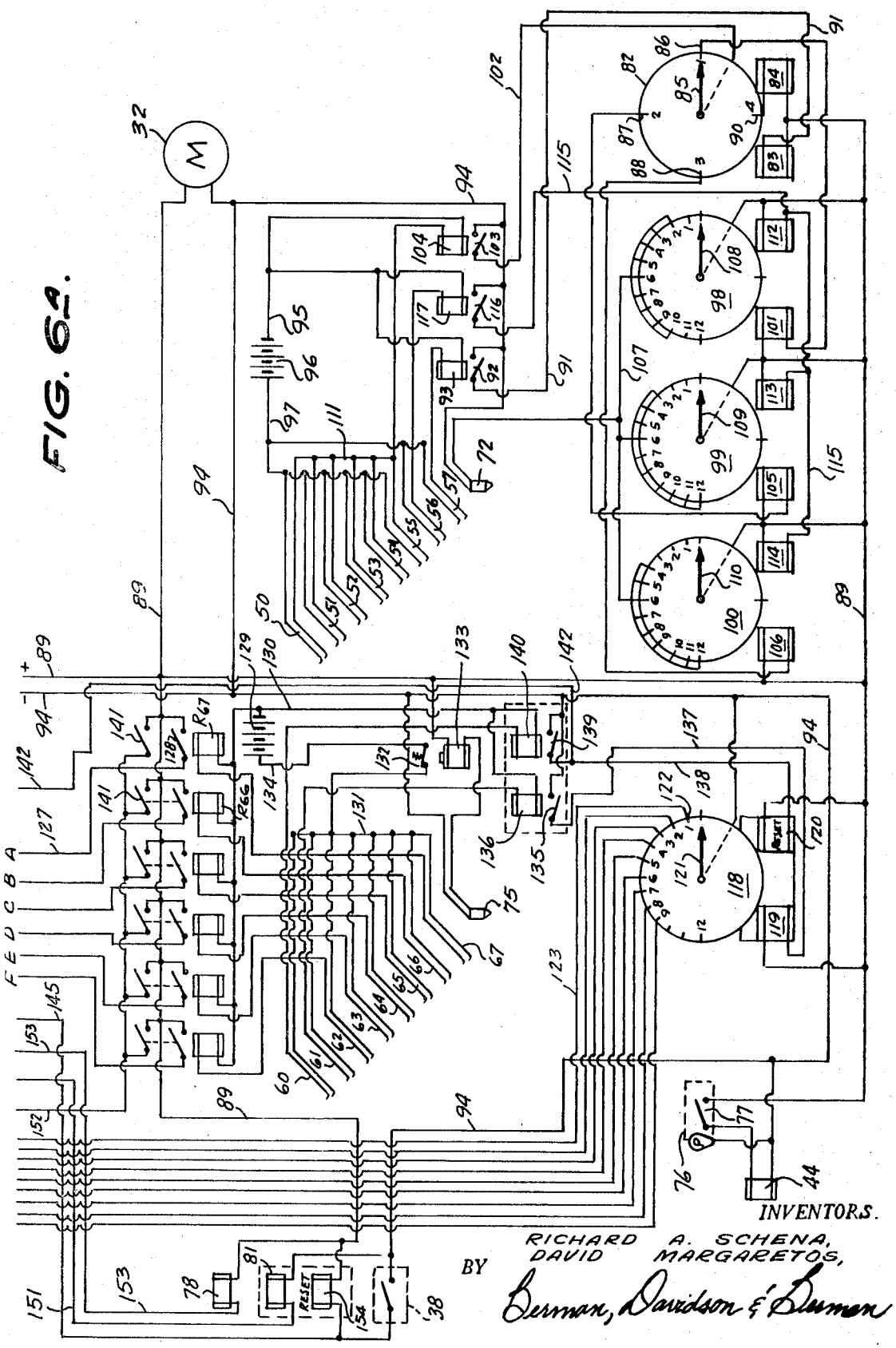

FIGS. 6 and 6a, taken together, constitute a schematic diagram showing the electrical connections of the main components of the ballot or test score counting machine of FIG. 1.

Referring to the drawings, 11 generally designates an improved ballot or test scoring counter constructed in accordance with the present invention. The device 11 comprises a generally rectangular bottom housing 12 provided with a longitudinally-hinged cover 13. The cover 13 may be raised to the generally vertical open position thereof shown in FIG. 1 when the device is to be operated.

Covers 13 contains a panel 14, secured in the cover in any suitable manner, and mounted on the panel 14 are a plurality of conventional electrically-operated counters 15 and associated control switches 16 for activating the counters, as will be presently explained. The counters 15 and associated control switches 16 are arranged in vertical rows for example, marked A, B, C, D, E, F, etc., representing different candidates, or choices, whereas said counters and switches are also arranged in successive horizontal rows, representing different categories wherein choices may be made. The horizontal rows may each comprise more than one category, for example, as in FIG. 1 wherein the top row comprises a first category from A to F and an additional category A, B, C, etc. Thus, each horizontal row may comprise one or more distinct categories. However, the counters of each category are selectively controlled in a manner to be presently described so as to enable the choices of each category to be tallied as a group. While the tallying is automatic, the respective counters can only be rendered operative by closing their associated switches 16, as will be explained presently in connection with Designated at 17 is a ballot or test card rack, which comprises a rectangular enclosure having vertical sidewalls 18 and parallel inclined front and rear walls 19, the enclosure being detachably-secured on the top wall 20, of housing 12. The enclosure 17 is arranged to receive in an inclined stack of ballot or score cards 21, with the forward portions of the cards projecting forwardly over the front transverse edge 23 of a rectangular aperture 22 in top wall 20. The sidewalls 18 may be detachably-secured to top wall 20, for example, by brackets 24 provided on said sidewalls.

A horizontal belt-supporting plate 25 is rigidly-secured between upstanding longitudinal partition walls 26,26 forming part of main housing 12, said plate 25 being located in the upper intermediate portion of said main housing. A sprocket chain endless belt conveyor assembly 27 is provided in said main housing with the top run of its belt 28 slidably-supported on plate 25. The side chains 29,29 of the conveyor belt are provided with drive projections 30 spaced to drivingly interengage with drive holes 31 provided at the opposite side margins of the cards 21, as shown in FIG. 2.

The assembly 27 is provided with the driving motor 32 which is drivingly coupled to the rear sprocket shaft 33 of the assembly through conventional speed reduction gearing, designated generally at 34.

Designated at 35 is a normally downwardly and forwardly-inclined ramp plate transversely hinged at 36, between the longitudinal vertical partition walls 26,26 forwardly adjacent a transverse fixed horizontal plate member 37 at the delivery end of the belt conveyor assembly 27. A microswitch 38 is mounted beneath the forward portion of fixed plate member 37 with its operating lever 39 located between plate member 37 and hinge 36 so as to be engaged by a card 21 driven forwardly from the belt conveyor assembly past plate member 37, as will be apparent from FIG. 5.

Ramp plate 35 is biased downwardly into engagement with a supporting flange 40 rigid with front wall 41 of main housing 12, by a coiled spring 42 connecting a bottom lug 43 on plate 35 to a lower marginal portion of one partition wall 26, as shown in FIG. 5. A solenoid 44 is pivoted on a transverse fixed shaft 45 secured between partition walls 26,26 rearwardly adjacent spring 42. The solenoid plunger, shown at 46, is pivotally connected to ramp plate 35 at a lug 47 spaced rearwardly from lug 43, as shown in FIG. 5. The energization of solenoid 44 elevates ramp plate 35 so that a card moving thereon is readily noticeable and can be easily segregated from the cards delivered in a normal manner down the normal slope of said ramp plate.

Designated at 48 is a first transverse feeler support bar rigidly secured on transversely alined upstanding lugs 49,49 on the top edges of partition walls 26,26. Secured on bar 48 are a first set of parallel downwardly and forwardly-inclined spaced double-prong feeler assemblies 50 to 57, the lower ends of the respective pairs of prongs being engageable on definite portions of a card 21 moved beneath bar 48 by the conveyor belt.

Designated at 58 is a second transverse feeler support bar rigidly secured on transversely alined upstanding lugs 59,59 in the top edges of the partition walls 26,26 located a substantial distance forwardly from the first feeler support bar 48. Secured on bar 58 are a second set of parallel downwardly and forwardly-inclined spaced double-prong feeler assemblies 60 to 67, the lower ends of the respective pairs of prongs being likewise engageable on definite portions of a card 21 progressing forwardly from the region subjacent bar 48.

The feeler assemblies 62 to 67 are respectively longitudinally alined with the feeler assemblies 50 to 55. Feeler assemblies 56 and 57 are displaced to the right of the other feeler assemblies, as viewed in FIG. 1 and in FIGS. 3 and 4, whereas feeler assemblies 60 and 61 are displaced to the left of the other feeler assemblies.

Feeler assembly 56 is alined with reset markings 68 on the choice cards 21 and feeler assembly 57 is alined with category being located at the right longitudinal marginal portion of the cards, as viewed in FIG. 2. Feeler assembly 61 is alined with line advance markings 70 on the choice cards, and feeler assembly 60 is alined with line relay resetting markings 71 on the cards. The markings 70 and 71 are located at the left longitudinal marginal portions of the cards, as viewed in FIG. 2.

The above-mentioned markings 68, 69, 70 and 71 comprise spots of conductive material which electrically bridge the spaced double prongs of the respective feeler assemblies 56, 57, 61 and 60 when engaged thereby.

The ballot or choice cards 21 are provided with diagonally-arranged rows of circular spaces or rings A to F longitudinally alined with the respective feeler assemblies 55, 54, 53, 52, 51 and 50 and also longitudinally alined with the respective feeler assemblies 67, 66, 65, 64, 63 and 62. A line advance marking 70 is located at the left end of each row of circular spaces, as viewed in FIG. 2. A reset marking 68 is located at the right end of each row. The rings A to F may be marked with pencil or other conductive material to indicate choices, the conductive markings acting to bridge the double prongs of feeler assemblies engaged thereby. The allowable number of choices is limited, however, and a card marked with an excessive number of choices will be rejected in a manner to be presently described.

Figure 3:
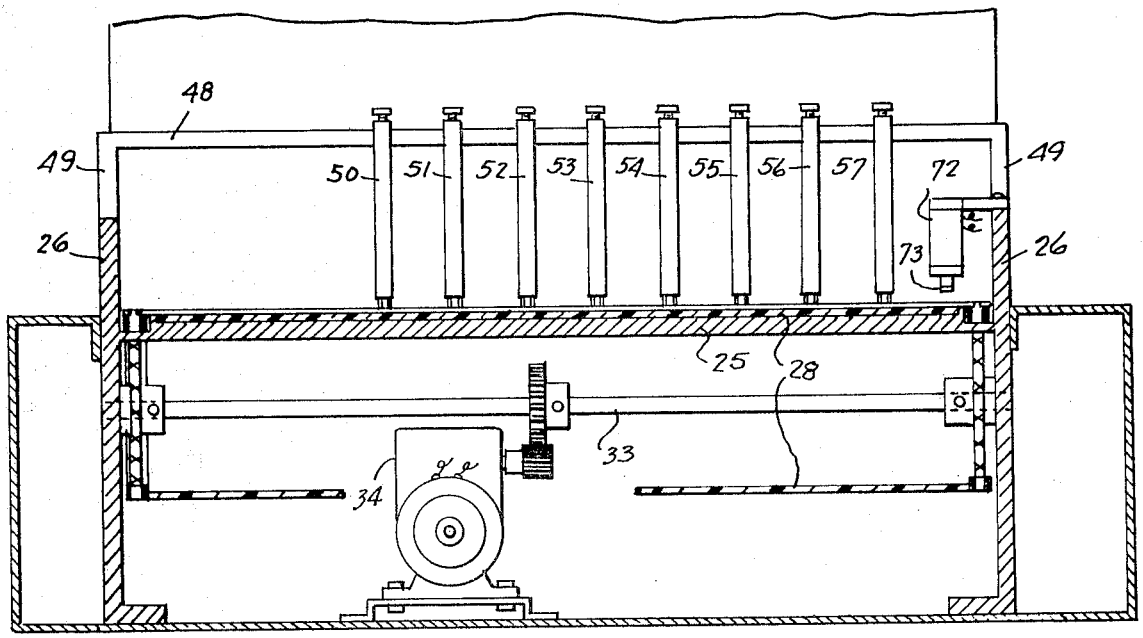
FIG. 3 is an enlarged transverse vertical cross-sectional view taken substantially on line 3—3 of FIG. 1.
Figure 4:
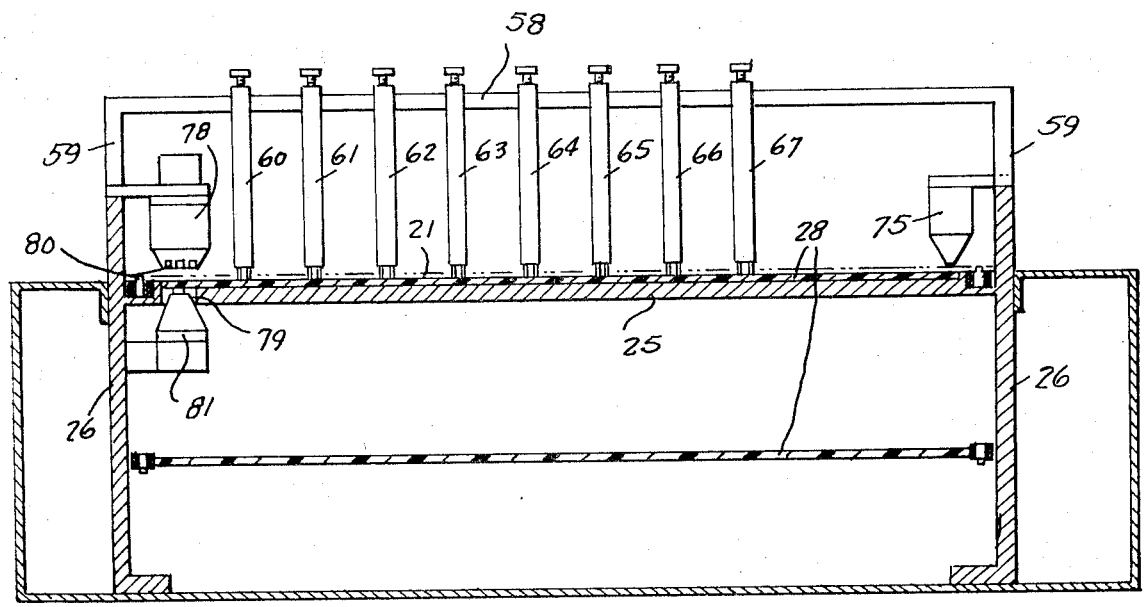
FIG. 4 is an enlarged transverse vertical cross-sectional view taken substantially on line 4—4 of FIG. 1.

An invalid mark-stamping solenoid 72 mounted on the right sidewall element 26, as viewed in FIG. 3, overlying the path of movement of the right side marginal portions of the choice cards 21, said solenoid being located forwardly of the transverse feeler support bar 48. The solenoid 72 is provided with a vertical plunger having an inked bottom stamper 73 arranged to impress a longitudinal bar-shaped mark 74 on the right side marginal portion of a subjacent card 21 responsive to the energization of the solenoid. A conventional photosensor 75 is mounted on the right sidewall element 26 at a location spaced forwardly from and longitudinally alined with the solenoid 72, arranged to detect an invalid marking 74 as a card carrying the same passes thereunder. As will be presently explained, the response of photosensor 75 to an invalid mark 74 prevents counting of the choice markings on a ballot or choice card 21.

Another conventional photosensor 76 is mounted on the right sidewall element 26 rearwardly adjacent the hinged card rejection plate 35. Photosensor 76 is located to detect an invalid mark 74 on a card 21 as the card is leaving the machine. As will be presently described, such detection causes the photosensor 76 to close its switch contacts 77 (see FIG. 6A) and to thereby energize the card rejection solenoid 44.

The machine is provided with means for marking totals when employed for counting test scores, as will be presently described. The test score total marking means comprises a stamping solenoid 78 vertically mounted on the left wall element 26, as viewed in FIG. 1, above and in vertical alinement with an aperture 79 in the belt-supporting plate 25 (see FIG. 4). The solenoid 78 is provided with conventional ink pad means 80 at the bottom end of its plunger. A conventional test score total counter 81 is mounted on the left wall element 26 below and in vertical alinement with solenoid 78, the counter 81 being of a type provided with embossed printing indicia and being arranged with its printing indicia exposed in aperture 19. Thus, when solenoid 78 is energized, its stamp pad element 80 forces the subjacent flexible marginal portion of a card 21 into clamping contact with the embossed indicia of counter 81, causing the card to be marked with the indicia and thereby printing the test score total in the card. As shown in FIG. 5, the solenoid 78 and counter 81 are located rearwardly adjacent the delivery end of the card conveyor belt assembly 27 and are spaced forwardly from the feeler support bar 58 and the feeler assemblies 60 to 67.

Designated at 82 (FIG. 6A) is a stepping relay, employed as a category selector. Relay 82 is provided with a stepping coil 83 and a reset coil 84. In the specific embodiment illustrated herein three selections are provided, namely, the rotary switch contact of the relay, shown at 85, can be stepped to three successive positions, whereby to engage any of three respective contacts 86, 87 or 88 responsive to the reception of an appropriate number of pulses by the stepping coil 83.

Stepping relay 82 is shown in its normal position, namely with pole 85 in engagement with contact 86. The stepping relay is reset to this position responsive to the pulsing of reset coil 84. As will be presently explained, this resetting takes place as a ballot or choice card 21 moves past the feeler assembly 57.

As shown in FIG. 6A, a first supply conductor 89 is connected to one terminal of each of coils 83 and 84. The remaining terminal of reset coil 84 is connected to the fourth step contact 90 of relay 82. The remaining terminal of stepping coil 83 is connected through a wire 91 and the contacts 92 of a relay 93 to a second supply conductor 94. One terminal of the winding of relay 93 is connected to the negative terminal wire 95 of a battery 96. The other terminal of said relay winding is connected through the two prongs of feeler assembly 57 to the positive terminal wire 97 of battery 96. Thus, relay 93 becomes energized each time the prongs of feeler assembly 57 are bridged by a conductive spot 69, closing contacts 92 and applying a pulse to stepping coil 83.

The spots 69 are suitably arranged on the cards 21 to place pole 85 in a position corresponding to the desired category of choices. Thus, when pole 85 engages contact 86, the selected category may be 1 out of X choices, when pole 85 engages contact 87, the selected category may be 2 out of X choices, and when the pole 85 engages contact 88, the selected category may be 3 out of X choices. When the category is to be changed, a suitable member of spots 69 provided on the card 21 being tallied will engage feeler assembly 57 to reset stepping relay 82 to its normal position as the card passes beneath said feeler assembly, so that the relay 82 can be stepped subsequently to the position thereof required for the next category. Relay 82 is thus controlled by the coding pattern of the conductive spots 69.

Relay 82 controls the selection of respective validating step relays 98, 99 and 100, corresponding to the three categories above mentioned. Thus, the validating step relay 98 is selected for operation when pole 85 engages contact 86, the validating step relay 99 is selected when pole 85 engages contact 87, and the validating step relay 100 is selected when pole 85 engages contact 88.

It will be seen from FIG. 6A that the stepping coil 101 of relay 98 is connected between line wire 89 and contact 86. The pole 85 of relay 82 is connected through a wire 102 and the contacts 103 of a relay 104 to line wire 94. Similarly, the stepping coil 105 of relay 99 is connected between line wire 89 and contact 87 of stepping relay 82, and the stepping coil 106 of relay 100 is connected between line wire 89 and contact 88 of relay 82.

Relay 98 has all its step contacts beyond the first step connected to a common wire 107. Relay 99 has all its step contacts beyond the second step connected to said common wire 107, and relay 100 has all its step contacts beyond the third step connected to said common wire 107. Wire 107 is connected to one terminal of the invalid stamping solenoid 72. The other terminal of said solenoid 72 is connected to line wire 94. The poles 108, 109 and 110 of the stepping relays 98, 99 and 100 are all connected to the other line wire 89. Therefore, whenever any of the relays 98, 99 or 100 are stepped beyond the number of steps corresponding to the associated selected category determined by the setting of step relay 82, the invalid stamping solenoid 72 becomes energized and applies an invalid mark 74 to the ballot or choice card being examined.

One terminal of the winding of relay 104 is connected to the battery negative wire 95. The other terminal of said relay winding is connected to a common wire 111, which is in turn connected to one prong of each of the pairs of prongs of the feeler assemblies 50 to 55. The remaining prongs of said pairs are connected to the positive battery wire 97. Therefore, relay 104 is pulsed each time any of the feeler assemblies 50 to 55 detects a conductive marking in a group of choice areas A to F passing beneath said feeler assemblies.

The closure of contacts 103 with each pulse delivered to relay 104 correspondingly pulses one of the stepping coils 101, 105 or 106, depending on the setting of pole 85. For example, with pole 85 in the position shown in FIG. 6A, the relay 98 (1 out of X choices) is the selected category relay. Stepping coil 101 will be pulsed for each closure of contacts 103. If coil 101 is pulsed more than once (as a result of more than one marked area A to F), pole 108 is connected to wire 107, causing the invalidation stamping solenoid 72 to be energized and to place an invalid mark 74 on the ballot or choice card.

It will thus be seen that an excessive number of markings in the choice areas A to F will automatically cause an invalidation mark 74 to be placed on the card under inspection.

The reset coils 112, 113 and 114 of the stepping relays 98, 99 and 100 each have one terminal connected to a common wire 115 which is in turn connected through the contacts 116 of a relay 117 to line wire 94. The remaining terminals of the reset coils are connected to the line wire 89. Thus, said reset coils are connected to the line wire 89. Thus, said reset coils are energized responsive to energization of relay 117. One terminal of the winding of relay 117 is connected to negative battery wire 95. The other terminal of said relay winding is connected through feeler assembly 56 to positive battery wire 97. Relay 117 therefore becomes energized responsive to the engagement of feeler assembly 56 with a reset spot 68 on a card 21. This occurs for each row of choices when the category is 1 out of X choices, as in the card 21 shown in FIG. 2, corresponding to the normal position of pole 85 shown in FIG. 6A, namely, in engagement with contact 86.

Designated at 118 is another stepping relay, employed for line advancement, namely, for successively actuating the counters of the respective horizontal rows on panel 14. Stepping relay 118 is provided with the stepping coil 119 and the reset coil 120. Said stepping relay 118 has the rotary contact arm 121 connected to line wire 94 and engageable in stepwise fashion with a series of stationary contacts 122 numbered 1, 2, 3 etc., to correspond with the successive horizontal rows of counters A to F on panel 14. For example, the 1 contact 122 is connected by a wire 123 to a wire 124. One terminal of each of the counters 15 of the 1 row is connected to said wire 124 through a respective manually operated switch 16, which when closed renders the associated counter operative.

The remaining terminals of the counters in the A vertical row are connected to a were 127 and thence through the contacts 128 of a relay R67 to the line wire 89. The winding of relay R67 has one terminal thereof connected to the negative lead wire 130 of a battery 129 and the other terminal thereof connected through the feeler assembly 67 to a common wire 131. Wire 131 is connected through the normally closed contacts 132 of a relay 133 to the positive lead wire 134 of battery 129.

Thus, with its switch 16 closed, the A counter 15 of the first horizontal row of counters will be actuated responsive to the bridging of the conductors of the feeler assembly 67 by a conductive spot on the card 21 passing thereunder, assuming that the arm 121 of step relay 118 has been stepped to engage the 1 contact 122.

Similarly, the B counters are controlled by a relay R66, which is in turn controlled by the feeler assembly 66 in the same manner as above described. The C, D, E and F counters are similarly controlled by the feeler assemblies 65, 64, 63 and 62.

The selection of the horizontal rows of counters is made by the step relay 118. Thus, as above explained, the first row is selected by stepping relay 118 to its first position, wherein pole 121 engages the 1 contact 122. When relay 118 is stepped to its next position, the second horizontal row of counters A to F is in activating condition etc.

One terminal of stepping coil 119 is connected to line wire 89. The other terminal thereof is connected to line wire 94 through a wire 137 and the contacts 135 of a relay 136. One terminal of the winding of relay 136 is connected to negative battery wire 130. The other terminal of said relay winding is connected through feeler assembly 61 and contacts 132 to positive battery wire 134. Thus, relay 136 will become energized responsive to the bridging of feeler assembly 61 by a conductive spot 70, causing stepping coil 119 to be pulsed, thereby advancing pole 121 one step and preparing the apparatus for counting on the next horizontal row of counters.

Reset coil 120 has one terminal thereof connected to line wire 89 and the other terminal thereof connected to line wire 94 by a wire 138 and the contacts 139 of a reset relay 140. One terminal of the winding of relay 140 is connected to negative battery wire 130. The other terminal of said relay winding is connected through feeler assembly 60 and contacts 132 to the positive battery wire 134. Thus, stepping relay 118 is reset responsive to the closure of contacts 139, which occurs when relay 140 becomes energized by the bridging of feeler assembly 60 by a conductive spot 71 on a card 21 passing thereunder.

It will be noted that counting can only take place as long as relay contacts 132 remain closed. The detection of an invalid mark 74 will cause these contacts to open. Thus, as shown in FIG. 6A, the winding of relay 133 is connected between line wires 89 and 94 through the conventional photoelectric spot detector 75. The device 75 may be of the resistive type, for example, greatly increasing its resistance responsive to exposure to a dark area. Thus, relay 133 is normally energized, holding its contacts 132 closed, but becomes deenergized when device 75 detects an invalidation mark 74, causing contacts 132 to open, thus disconnecting wire 131 from positive battery wire 134 and thereby preventing counting.

As shown in FIG. 2, the invalidation mark 74 is so located and dimensioned that it subtends the longitudinal length covered by the choice mark areas A to F on the card 21 and does not interfere with the action of the feeler assemblies 60 and 61, but acts only to nullify the action of feeler assemblies 62 to 67.

It is to be noted that the line advance step relay 118 is automatically reset to its starting position responsive to the delivery of a ballot or test card 21 forwardly past the microswitch 38. Thus, a wire 142 connects the reset terminal wire 138 to line wire 94 through the normally open contacts 143 of a relay 144. One terminal of the winding of relay 144 is connected to line wire 89. The other terminal of said winding is connected by a wire 145 through microswitch 38 to line wire 94. Therefore, when a card actuates microswitch 38, relay 144 is energized, closing its contacts 143 and thereby energizing reset coil 120.

A manually operated two-pole switch 146 is provided for setting the machine for test card scoring. Said switch has the respective poles 147 and 148 which may be moved into engagement with associated stationary contacts 149 and 150.

Test score counter 81 has one terminal thereof connected to line wire 94. The other terminal thereof is connected by a wire 151 to pole 147. Stationary contact 149 is connected by a wire 152 to line wire 89 through additional contacts 141 of the relays R67, R66, etc., said additional contacts 141, operating simultaneously with the contacts 128, and which are thus utilized when the machine is employed for counting test scores, since each closure of the contacts 141 supplies a counting pulse to counter 81.

The reset wire 142 (associated with reset coil 120) is connected to switch pole 148. Stationary contact 150 is connected by a wire 153 to one terminal of the score marker solenoid 78. The other terminal of said solenoid is connected to line wire 89. Thus, as reset coil 120 becomes energized responsive to the engagement of a test card with microswitch 38, assuming poles 147 and 148 to be in closed positions, score marker solenoid 78 simultaneously becomes energized and stamps the card with the counted total score.

Counter 81 is provided with a reset coil 154 connected between line wire 89 and wire 145. Counter 81 is therefore reset to zero responsive to the closure of microswitch 38, since wire 145 is connected to the remaining line wire 94 through said microswitch. Therefore, counter 81 is reset to zero responsive to the engagement of the test card with the microswitch, and simultaneously with the stamping of the card with the counted total score.

Line wire 89 is provided with a manually operated master control switch 155, as shown in FIG. 6.

With master control switch 155 closed and with the manually operated double pole switch 146 set in its open position as shown in FIG. 6, the apparatus is set for operation as a ballot counter. The switches 16 on the display panel 14 are closed in accordance with the names of the candidates in the various categories, whereby to make their associated counters 15 ready for operation.

In operation, the ballot cards 21 are fed in sequence by gravity from the test or ballot card rack 17, the lowermost card in the stack being engaged by the projections 30, as above described, and being moved along the plate 25 by the top portion of the conveyor belt 18.

The ballot cards 21 are previously marked by the voters in the spaces A to F, the choice of candidate being represented by marking the appropriate space with conductive material, such as graphite from a pencil. As above described, the cards are previously suitably coded by the provision therein of the conductive spots 68, 69, 70 and 71 thereon. The number of choices in each category corresponds with the coding pattern of the spots 69.

If an excessive number of spaces in any row A to F is marked in by a voter, this is detected by the action of the appropriate step relay 98, 99 or 100, as above described, causing the stamping solenoid 72 to be energized and to place an invalid mark 74 on the ballot card. This mark is subsequently detected by photosensor 76 which thereby energizes the card rejection solenoid 44. Prior to this, the mark 74 is detected by photosensor 75, whereby to open contacts 132 and prevent counting.

If the ballot card successfully passes the feeler assemblies 50 to 55 without being invalidated, the marked spaces on the card are sensed by the feeler assemblies 62 to 67, and the associated counters 15 are thereby actuated. After all the ballot cards are run through the machine in the manner above described, the counters 15 will show the total number of votes for each candidate in each category.

When the apparatus is to be used for counting test choices rather than votes, switch 146 is operated to its closed position, wherein poles 147 and 148 respectively engage contacts 149 and 150. This establishes the circuit for making the totalizing counter 81 effective, as well as the various counters 15. Every closure of a set of contacts 141 for a given test card will be counted by the counter 81. Therefore, after a set of test cards 21 has been run through the apparatus, the counters 15 will give the totals of the various possible choices in the different categories. Each card will carry imprinted thereon by the marker 78 a number representing the total choice marks thereon.

As in the case of the ballot cards, an excessive number of answer or choice marks in a test category will cause the test card to be invalidated and rejected in the manner above described.

While a specific embodiment of an improved invalid ballot or test card detector has been disclosed in the foregoing description, it will be understood that various modifications within the spirit of the invention may occur to those skilled in the art. Therefore, it is intended that no limitations be placed on the invention except as defined by the scope of the appended claims.

We claim:

1. In a register, a support, a conveyor on said support, means to feed choice cards to said conveyor, two longitudinally spaced transverse rows of pairs of feeler electrodes mounted on the support over the conveyor in positions to engage the choice cards, category-selecting first step relay means, circuit means operatively connecting a pair of feeler electrodes of the first row to said first step relay means to advance said first step relay in steps in accordance with conductive spots engaged by said last-named pair, second step relay means, circuit means including contacts of said first step relay means operatively connecting other pairs of feeler electrodes of said first row to said second step relay means to advance said second step relay means in accordance with conductive spots engaged by said other pairs, an invalid marking means mounted in said support over the conveyor in a position to mark a choice card traveling thereon, means to energize said marking means to form a mark on a card responsive to a predetermined number of advancement steps of said second step relay means, counter means, circuit means operatively connecting certain pairs of feeler electrodes of the second row to said counter means, and means to render the counter means inoperative responsive to the presence of a mark made by said marking means on a choice card traveling on said conveyor.

2. The register of claim 1, and wherein the means to render the counter means inoperative comprises a photosensing device overlying the path of movement of said mark, normally closed switch means in said last-named circuit means, and means to open said switch means responsive to the presence of a mark beneath said photosensing device.

3. The register of claim 1, and wherein said counter means comprises a plurality of rows of counters representing respective different categories, third step relay means, circuit means operatively connecting another pair of feeler electrodes of said second row to said third step relay means to advance said third step relay in accordance with conductive spots engaged by said last-named pair of electrodes, and circuit means sequentially connecting said certain feeler electrode pairs to the respective rows of counters responsive to the successive advancement steps of said third step relay means.

4. The register of claim 3, and wherein each counter is provided with an operating circuit including a respective manually-controlled switch for making each counter operative.

5. The register of claim 4, and wherein the third step relay means includes a plurality of fixed contacts and a movable contact successively engageable in stepwise fashion with said fixed contacts, the counters of each row being connected through said manually-controlled switches to a respective one of said fixed contacts.

6. The register of claim 5, and wherein the counters are arranged in horizontal and vertical rows, each vertical row of counters having a common terminal conductor, and wherein the last-named circuit means sequentially connects said certain feeler electrode pairs to the respective horizontal rows responsive to the advancement steps of said third step relay means.

7. The register of claim 6, and a respective control relay associated with each common terminal conductor, each control relay having a set of contacts in circuit with its associated common terminal conductor, each of said certain feeler electrode pairs being operatively connected to one of said control relays.

8. The register of claim 1, and movable card-deflecting means adjacent the delivery end of said conveyor, and means to actuate said card-deflecting means responsive to the presence of a mark made by said marking means on a choice card traveling on said conveyor.

9. The register of claim 8, and wherein said card-deflecting means comprises a pivoted ramp member located in the path of movement of a card leaving the conveyor, said means to actuate said card-deflecting means comprising a solenoid operatively connected between said support and said ramp member and means to energize said solenoid responsive to the presence of a mark on the choice card.

10. The register of claim 9, and wherein the means to energize said solenoid comprises a source of current, photosensitive switch means mounted on the support adjacent said ramp member overlying the path of movement of the marked portion of a card, and circuit means connecting said solenoid to said source of current through said photosensitive switch means.

11. The register of claim 7, and additional counter means, and means to actuate said additional counter means each time said certain pairs of feeler electrodes engage a conductive spot on a card passing therebeneath.

12. The register of claim 11, and wherein said third step relay means is provided with reset means, and means to actuate said reset means responsive to the discharge of a choice card from said conveyor.

13. The register of claim 12, and wherein said additional counter means is provided with total-printing means engageable with a card being delivered from said conveyor, and means to actuate said total-printing means responsive to the discharge of a choice card from said conveyor.

14. The register of claim 3, and wherein said support comprises a housing having a horizontal belt-supporting plate and said conveyor comprises an endless belt assembly mounted in said housing and including an endless conveyor belt whose top run is slidably supported on said plate.

15. The register of claim 14, and wherein said endless conveyor belt is provided at its opposite marginal portions with drive projections adapted to drivingly interengage with choice cards.

16. The register of claim 15, and wherein said invalid marking means is located over a side marginal portion of said endless conveyor belt.